United States Patent
Larson et al.

[11] Patent Number: 5,867,900
[45] Date of Patent: Feb. 9, 1999

[54] PLASTIC COATED VALVE ROTOR AND A METHOD OF MANUFACTURING

[75] Inventors: Ralph H. Larson, Bayport; William M. Yavorsky, Woodbury, both of Minn.

[73] Assignee: Ecowater Systems, Inc., Woodbury, Minn.

[21] Appl. No.: 920,091

[22] Filed: Aug. 26, 1997

[51] Int. Cl.$^6$ ............................................. F16K 11/06
[52] U.S. Cl. ................................. 29/890.127; 264/279
[58] Field of Search .................... 29/890.127; 264/279

[56] References Cited

U.S. PATENT DOCUMENTS

| | | | |
|---|---|---|---|
| 2,807,511 | 9/1957 | Fleming | 309/23 |
| 3,011,219 | 12/1961 | Williams | 18/59 |
| 3,438,388 | 4/1969 | Schenck, Jr. | 137/375 |
| 3,459,213 | 8/1969 | Schenck, Jr. et al. | 137/340 |
| 3,537,700 | 11/1970 | Schenck, Jr. et al. | 264/112 |
| 3,597,820 | 8/1971 | Schenck, Jr. | 29/157.1 |
| 3,698,422 | 10/1972 | Freed et al. | 137/375 |
| 3,939,907 | 2/1976 | Skvarenina | 165/86 |
| 4,017,576 | 4/1977 | Freed et al. | 264/91 |
| 4,172,112 | 10/1979 | Tsukagoshi et al. | 264/113 |
| 4,312,961 | 1/1982 | Winegar et al. | 525/4 |
| 4,313,901 | 2/1982 | Chu | 264/127 |
| 4,362,473 | 12/1982 | Zeilon | 417/68 |
| 4,646,407 | 3/1987 | Mayhew, Jr. | 29/157.1 |
| 4,705,627 | 11/1987 | Miwa et al. | 210/264 |
| 5,141,018 | 8/1992 | Guterman | 137/375 |
| 5,168,895 | 12/1992 | Voss | 137/494 |
| 5,275,206 | 1/1994 | Acker | 137/625 |
| 5,295,520 | 3/1994 | Acker | 141/39 |
| 5,296,183 | 3/1994 | Carbone et al. | 264/131 |
| 5,399,307 | 3/1995 | Dalton et al. | 264/113 |
| 5,413,311 | 5/1995 | Arstein et al. | 251/331 |
| 5,564,679 | 10/1996 | Ericson et al. | 251/308 |

FOREIGN PATENT DOCUMENTS 0 795 703 A1  3/1997  European Pat. Off. .

OTHER PUBLICATIONS

Kenmore Standard Capacity 30 Water Softener Owners Manual (Sears); 7117264 (Mar. 1992); Model No. 625.3483003; pp. 1,28,29 and 32.

*Primary Examiner*—John Fox
*Attorney, Agent, or Firm*—Rudnick & Wolfe

[57] ABSTRACT

A method of manufacturing a valve rotor with a wear-resistant, low-friction surface, wherein a disk having angled edges and a shape which correspond with the surface of the rotor is formed from a sheet of polytetrafluoroethylene (PTFE). The disk is placed at the bottom of a mold cavity, and a plastic material is injected in the mold. The plastic fills the mold cavity surrounding and covering the angled edges of the disk. Once hardened, the plastic is locked together with the angled edges of the PTFE disk. In a preferred embodiment, a method of manufacturing a water treatment valve rotor with a PTFE rotating surface is shown.

7 Claims, 4 Drawing Sheets

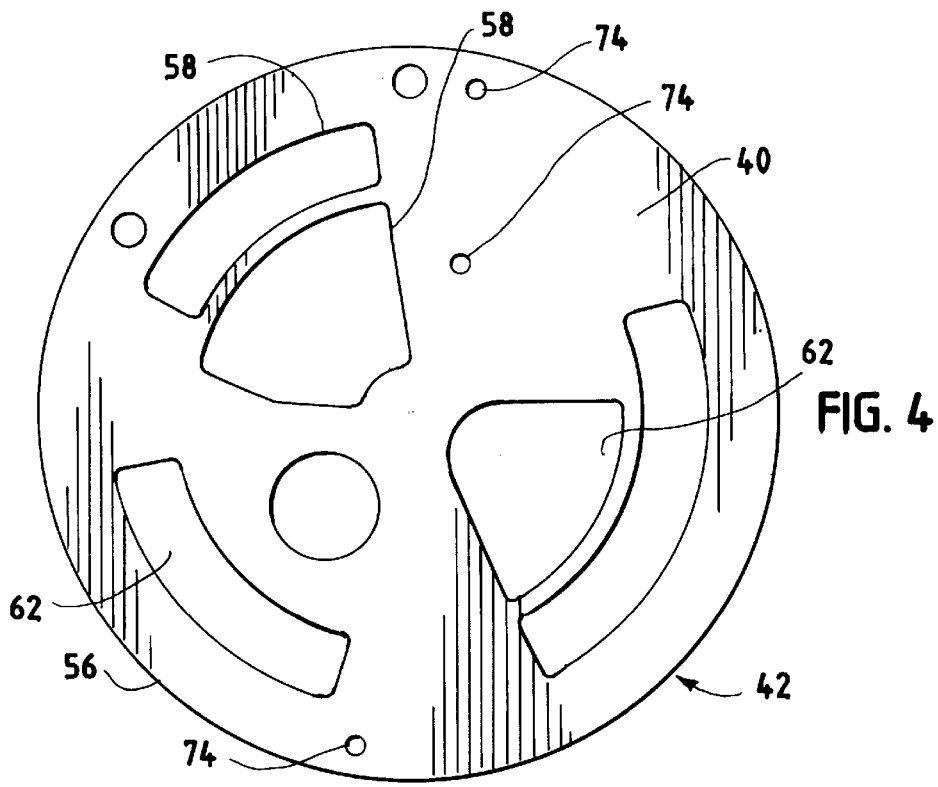
FIG. 4
FIG. 5
FIG. 6
FIG. 7
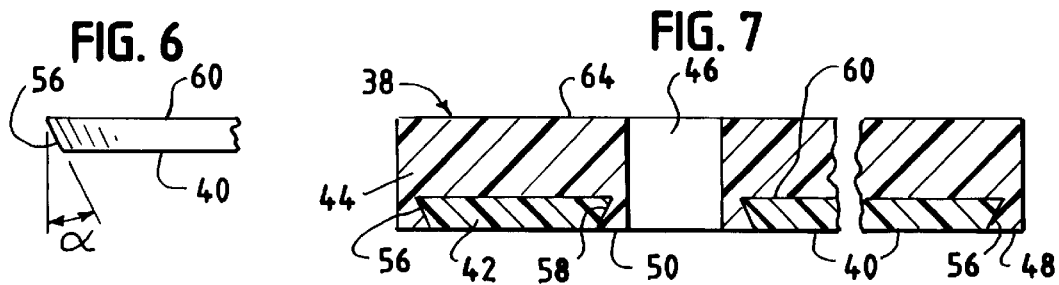
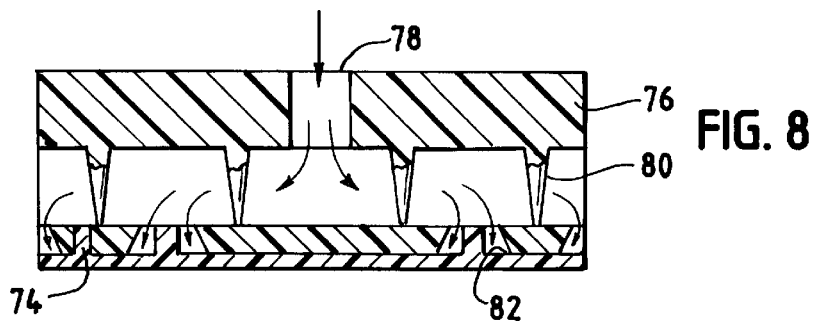
FIG. 8

PLASTIC COATED VALVE ROTOR AND A METHOD OF MANUFACTURING

FIELD OF THE INVENTION

The present invention relates generally to a valve rotor with a wear-resistant, low friction plastic surface, and a method for manufacturing the valve rotor. More particularly, the invention relates to a water treatment valve and a valve rotor with a wear-resistant, low friction rotating seal surface, and a method of manufacturing the valve rotor.

BACKGROUND OF THE INVENTION

Fluid handling systems and other fluid valve systems include a valve having a rotor. The rotor often includes a plastic disk with various ports. As the disk rotor rotates, the various ports control the flow of fluid through the valve.

Typically, an electric motor is coupled to the rotor to provide the rotational movement of the rotor. A motor control is used to control activation of the motor as required by the system. The size of the motor is dictated by several factors including the rotational load of the rotor and the breakaway torque necessary to start rotation of the rotor from a resting position. The necessary breakaway torque is dependent, in part, on the friction of the rotating surface of the disk and the eccentric actuating forces applied to the rotor during rotation which tend to lift, or cant, the rotor, causing extensive tension. It is therefore desirable to provide a disk rotor having a low friction surface.

As fluid handling systems often have a long service life, the opportunity is present for contaminants (lime, iron, rust etc.) to build up on the disk producing a rough surface which increases the coefficient of friction. The combination of the rotor ports and contaminated disk surface tend to displace and further wear the stationary rubber gaskets engaged with the rotating disk.

Various prior art systems have addressed the issue of low friction surfaces, as well as improving other properties of the component parts.

In various fluid-handling systems where high pressures and temperatures are present, there is a demand for component parts with improved pressure and heat-resistant properties. Increases in the variety of chemicals and liquids encountered in fluid-handling systems have created a greater need for corrosion-resistant component parts. One of the known methods for improving the corrosion and wear resistance of components is to cover the surface of the system components with a coating of an appropriate material.

A variety of materials have been used in the past as corrosion resistant coatings, including polytetrafluoroethylene (PTFE) and other fluorocarbon polymers. PTFE, also known under the trademark Teflon, is used in protecting and improving properties of various component units, such as liquid control valves and the components thereof. In the form of a powdered resin, PTFE can be molded in sheets and other shapes, or directly into a finished part of a product. Sheets, bars, or other shapes of compression molded PTFE are used to create many useful articles that take advantage of its chemically impervious nature and low coefficient of friction.

Valves and valve components using such material as a lining or coating have been described or suggested, as for example, in U.S. Pat. No. 3,537,700, which discloses a corrosion resistant coating formed on the base member by an isostatic compression using granular polymeric PTFE powder, then removed and heated to a temperature above the gel point of PTFE. The process is costly, and the coating is not reliable when used under pressure and high temperatures. Present methods of coating molded articles with adhesive-free polymers are also unsatisfactory. Often the bond between the coating and article surface is inconsistent, resulting in separation of the coating from the molded article.

U.S. Pat. No. 5,295,520 discloses a rotary face valve which has been used in carousel-type beverage fillers. Positioned within the body is a Teflon disk which provides the dynamic sealing surface for engagement by the valve rotor. An adjustable spring provides a bias force which urges the rotor against the disk. Passages formed in the valve body and Teflon disk communicate with the various lines and nozzle and cooperate with connecting passages in the valve rotor.

U.S. Pat. No. 5,296,183 discloses a method, particularly for comolding a property enhancing coating and composite articles, which is provided by applying the coating, such as Teflon, to a formed and shaped carrier substrate which is placed into the mold. Plastic is injected into the mold such that the plastic infiltrates the irregularities in the coating surface during molding and therefore locks the coating to the part after curing.

A method for manufacturing a valve disk of a synthetic resin powder material is described in U.S. Pat. No. 4,172,112. The method includes pressure-molding two valve disk cover segments from a tetrofluoroethylene resin, molding the formed segments with a previously made disk-like core therebetween under high pressure, and then heating the valve disk segments which have been compacted and bonded integrally with the core. This method is complicated, requires expensive high pressure molding equipment, and may be effective only when a fully covered article of a complicated configuration is required.

SUMMARY OF THE INVENTION

It is an object of the present invention to reduce the manufacturing cost of a fluid handling system having a motor driven fluid valve.

It is further object of the present invention to reduce the torque output requirement of an electric motor in a fluid handling system.

It is still a further object of the present invention to provide a fluid-handling valve having a disk rotor with improved breakaway torque characteristics and longer product life.

Yet a further object of the present invention is to provide a retro-fit valve rotor having improved break-away torque characteristics.

Yet still a further object of the present invention is to provide a method for applying wear-resistant, low friction, adhesive-free coatings to a molded valve rotor.

It is still a further object to provide a manufacturing method to incorporate a wear-resistant, low friction coating in a valve to reduce production steps and minimize costs.

These and other objects, features, and advantages of the present invention will become apparent from the following description when taken in conjunction with the accompanying drawings, which illustrate a preferred embodiment of the present invention.

The present invention provides a method of manufacturing a valve rotor with a wear-resistant, low friction rotating surface, comprising, providing a disk formed from a fluorocarbon polymer, the disk having a shape and an edge which correspond with the rotating surface of the valve rotor, placing the disk at the bottom of a cavity of a provided injection mold, injecting flowable material into the mold such that the material fills a portion of the mold cavity, substantially surrounding and covering the edge of the disk, solidifying the material to lock with the disk and to form a rotor disk, removing the rotor disk from the mold, and securing the rotor disk to the base of the valve rotor with the disk facing outwardly and providing the rotating surface.

The present invention also provides a rotor for operation in a rotary valve comprising a base with flow ports, the base having a first disk and a second disk, the first disk being secured to the base and being formed from a non-metallic material and having passages which correspond with the flow ports of the base, and the second disk being formed from a polymer material having a shape corresponding to the first disk including passages which correspond with the flow ports of the base, a shaft extending from the base, and means for locking the first disk to the second disk.

The present invention also provides a rotary valve comprising a valve housing, a rotor received by the valve housing, the rotor having a base with flow ports, the base having a first disk and a second disk, the first disk being secured to the base and being formed from a non-metallic material and having passages which correspond with the flow ports of the base, and the second disk being formed from a polymer material having a shape corresponding to the first disk including passages which correspond with the flow ports of the base, a shaft extending from the base, and means for locking the first disk to the second disk, and a valve cover securable to the valve housing.

In the illustrated embodiment of a rotor, in according with the present invention, the rotor is provided with a rotor disk having a shape and passages which are compatible with prior art rotor disks. Therefore, the present rotor can be substituted as a replacement rotor for existing prior art valves without any substantial modification. The use of a Teflon disk reduces the co-efficient of friction and the accumulation of contaminants. Significantly, experimental results have shown a 50% reduction in the break-away torque in converting from a plastic sliding surface to a Teflon sliding surface for a rotor disk. The reduction in break-away torque provides the advantage that a motor of reduced size and cost may be used.

BRIEF DESCRIPTION OF THE DRAWINGS

The present invention is described below with reference to the following drawings, which show the preferred embodiment of the invention:

FIG. 4 is a plan view of a polytetrafluoroethylene disk of the rotor disk, providing the rotating surface of the valve rotor.

FIG. 5 is a side view of the polytetrafluoroethylene disk of FIG. 2.

FIG. 6 is an enlarged view of a beveled or angled edge of the disk of FIG. 4 and 5.

FIG. 7 is a sectional view of a rotor disk in accordance with the present invention.

FIG. 8 is a cross-sectional view of an injection mold and the polytetrofluoroethylene disk, the mold being in the process of injecting the flowable material in accordance with the present invention.

DETAILED DESCRIPTION OF THE PREFERRED EMBODIMENT

Figure 1:
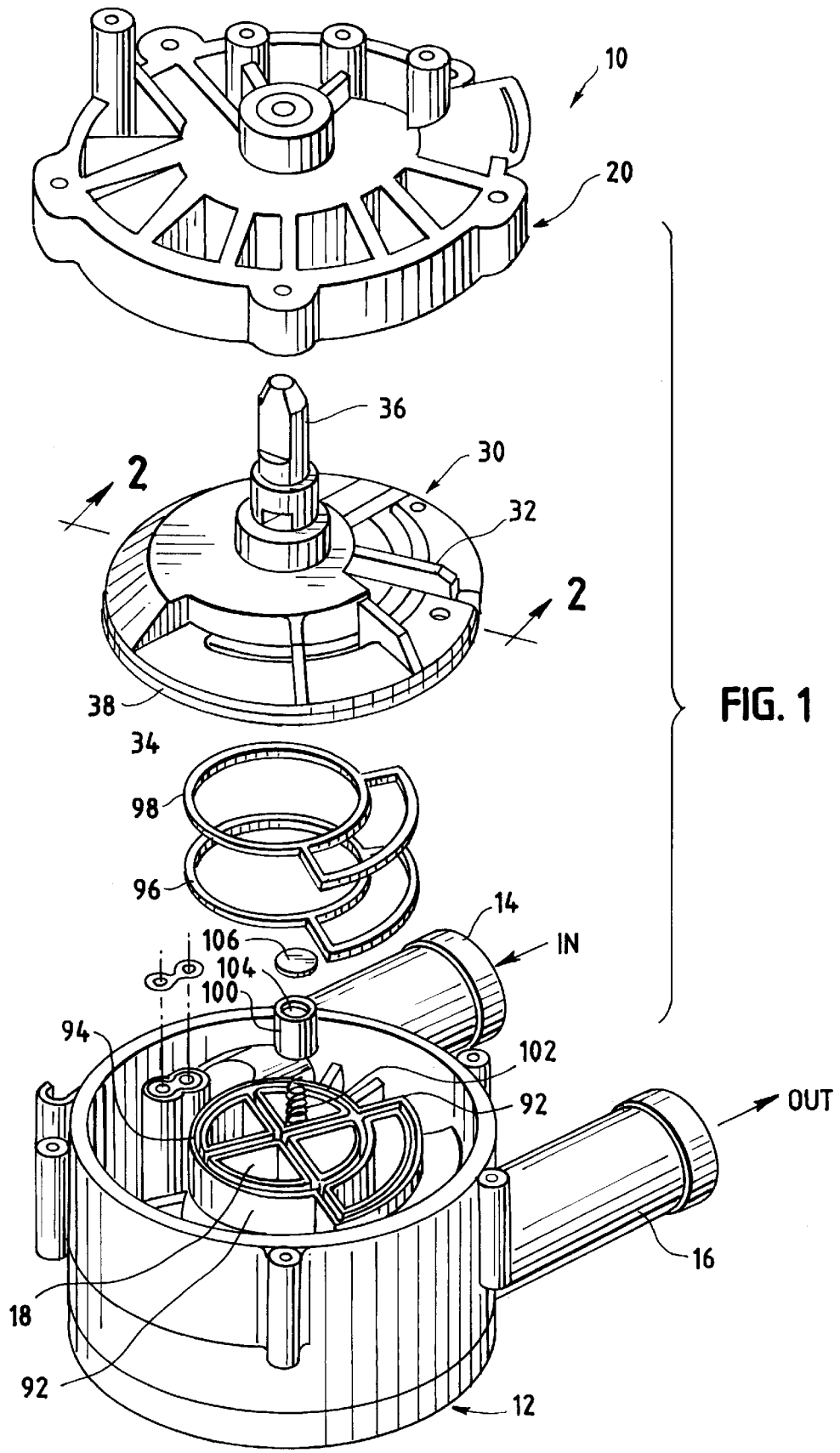
FIG. 1 is an exploded view showing a rotary valve assembly in accordance with the present invention.

Illustrated in FIG. 1 is an assembly 10 of a rotary valve for water treatment, which includes a valve body 12 with an inlet 14, an outlet 16, a valve chamber 18, a valve cover 20, and a rotor 30.

Figure 2:
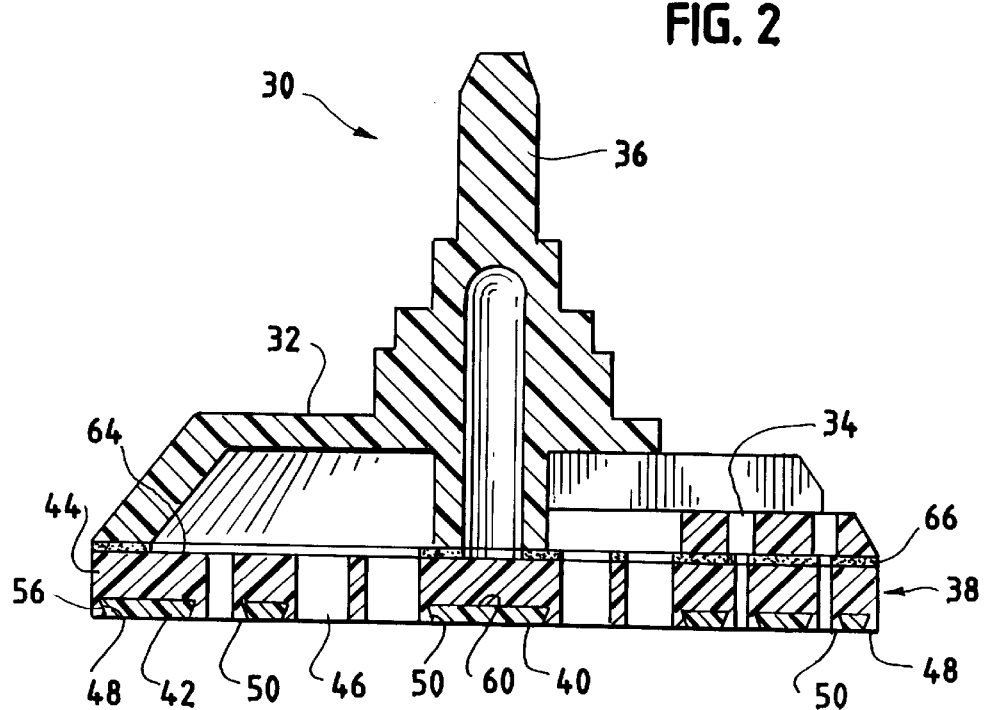
FIG. 2 is a cross-sectional view of a valve rotor shown in FIG. 1 with an attached rotor disk having a wear-resistant, low friction rotating surface in accordance with the present invention.
Figure 3:
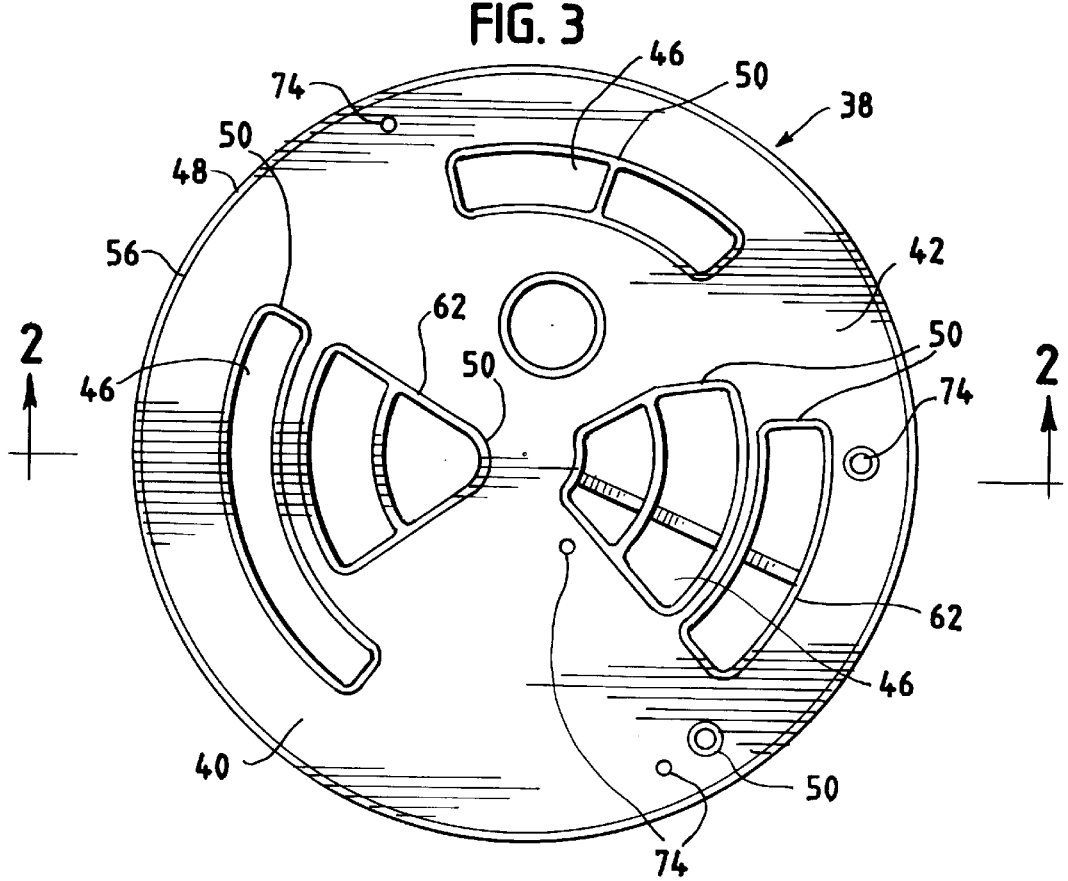
FIG. 3 is a plan view of the rotor disk of the present invention.

As best shown in FIG. 2 and FIG. 3, the rotor 30 includes a base 32 with flow ports 34, a shaft 36 extending from the base 32, and a rotor disk 38 attached to the base 32 in order to form a low-friction rotating surface 40. The rotor disk 38 comprises a Teflon disk 42 interlocked with a molded plastic disk 44 having passages 46 which correspond to the flow ports 34 in the rotor base 32. The molded plastic disk 44 is provided with an angular flange 48 extending along the perimeter, and angled borders 50 surrounding passages 46. FIG. 4 shows the Teflon disk 42 which was stamped from a sheet of Teflon 52 (see FIG. 10). The thickness of the Teflon sheet 52 ranges from 0.015 inch to 0.060 inch. One surface 54 of the Teflon sheet may be pre-treated with an etchant and a primer. The stamping die (not shown) cuts the Teflon sheet such as to make a beveled or angled perimeter edge 56 and beveled or angled passage edges 58 as best seen in FIG. 4 and 5. The cut angle $\propto$ is shown in FIGS. 5 and 6, where 60 is the pre-treated surface of the disk 42. The passages 62 of Teflon disk 42 shown in FIG. 4 correspond to the passages 46 of the molded plastic disk 44, but are larger in order to allow the flange 48 and borders 50 of the molded plastic disk 44 to lock with the corresponding angled edges 56 and 58 of the Teflon disk 42 as shown in FIG. 7. The rotor disk 38 manufactured by the method of the present invention is shown in FIG. 3. The rotor disk 38 includes a Teflon surface 40, angular flange 48, and passages 46 surrounded with molded plastic borders 50. The other surface 64 of rotor disk 38 is made of plastic and, as shown in FIG. 2, is attached to the base 32 of the rotor 30 by a layer of cement 66.

Figure 9:
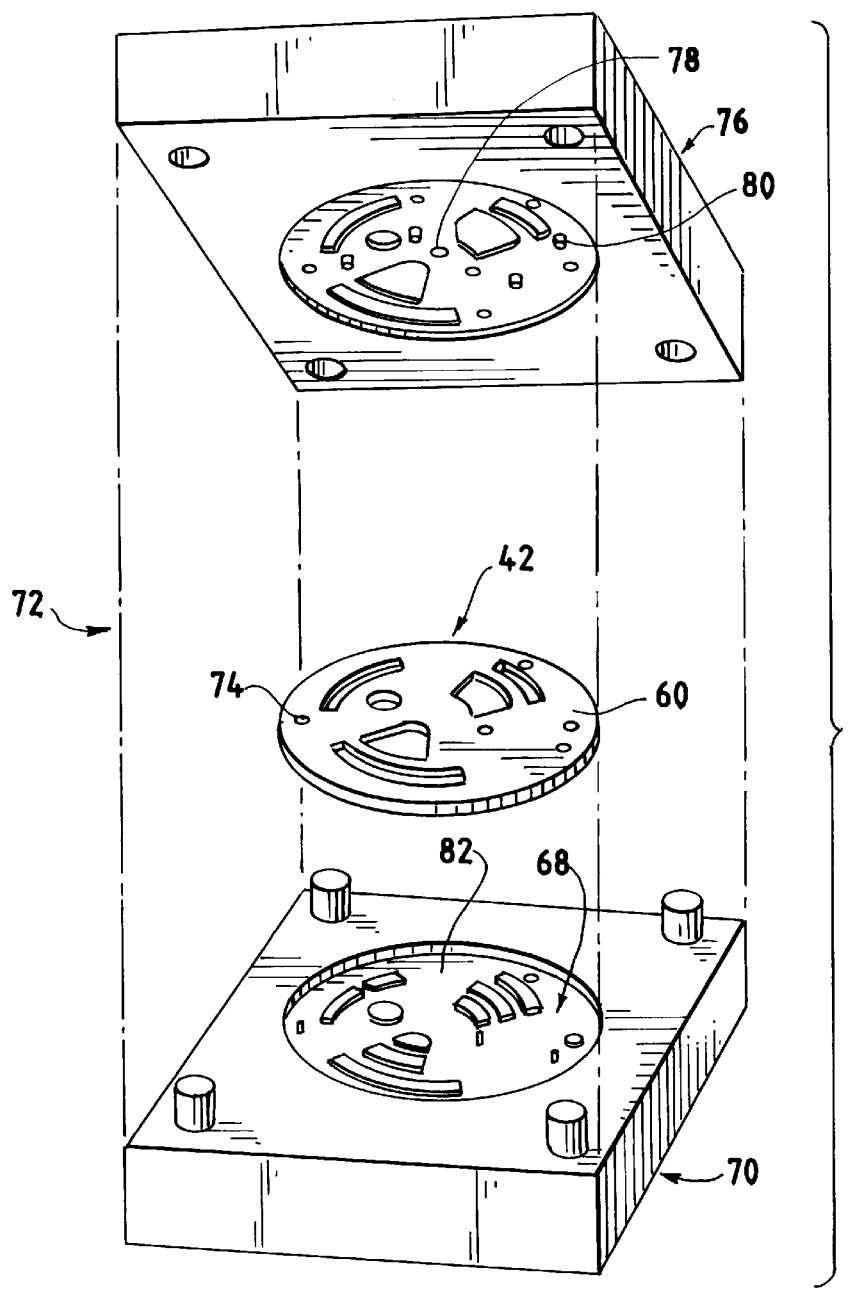
FIG. 9 is an exploded view of the injection mold with an inserted polytetrafluoroethylene disk before the injection of the flowable material in accordance with the present invention.
Figure 10:
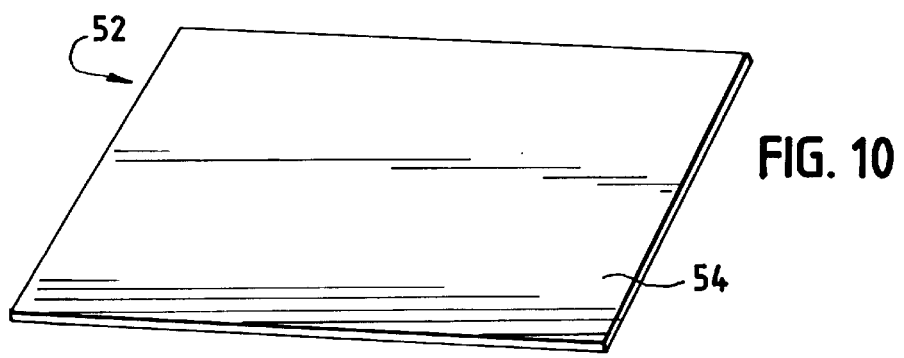
FIG. 10 is a plan view of a sheet of polytetrafluoroethylene.

Description will next be made of the manufacturing method of the rotor 30 of the present invention with reference to FIGS. 8–10.

The rotating surface of the rotor according to the present invention is formed from the sheet 52 of polytetrafluoroethylene, or Teflon. In order to provide optimum toughness and durability, the thickness of the Teflon 52 sheet should be from 0.015 inch to 0.060 inch. One side 54 the Teflon sheet 52 may be pre-treated by an etchant and a primer. An example of a polytetrafluoroethylene primer which may be used is Dupont Teflon Primer 852-201. Using a stamping die (not shown), the Teflon disk 42 of required configuration is cut out of the Teflon sheet 52 such that all edges 56, 58 of the disk 42, including those of the perimeter and the passages 62, are inclined inwardly away from the pre-treated surface 60 providing a cut angle $\propto$, as best shown in FIGS. 5 and 6.

The Teflon disk 42 is then placed on the bottom of the cavity 68 of a first portion 70 of a provided injection mold 72 with the pre-treated surface 60 (if applicable) facing outwardly. For orientation purposes the Teflon disk 42 is provided with three holes 74 held to a close-tolerance dimension so that, when inserted in the mold 72, the Teflon disk 42 has the proper position. The first portion 70 is brought into engagement with a second portion or cover 76, and a flowable plastic is injected through the inlet 78 to fill the mold cavity 68. The flowable plastic may be any thermo plastic molded material, preferably of high strength, such as Noryl or ABS. The cover 76 is constructed with approximately twenty one strategically placed pins 80, examples of which are shown in FIGS. 8 and 9. The function of the pins 80 is to hold the Teflon disk 42 against the bottom 82 of the mold cavity 68 so that the injected plastic will not flow around over the rotating surface 40 of the Teflon disk 42. The inlet 78 is provided above the Teflon disk 42 to further reduce the possibility of injected molded plastic flowing between the rotating surface 40 of the disk and the first portion 70 of the mold 72. The passages 62 in the Teflon disk 42 are larger than those of the molded plastic disk 46. The effect of this is to allow the molten plastic to fully cover the edges of the Teflon disk passages 62. After solidification, the plastic forms the raised angled borders 50 which surround the passages 46. These borders 50 together with the angular flange 48 formed along the perimeter, mechanically lock the Teflon disk 42 by virtue of the cut angle. The combined rotor disk 38 is removed from the mold. The side of the rotor disk 38 having the molded plastic disk 44 is attached to the rotor base 32 with a layer of cement, glue, or other compound 66. Alternatively, the rotor disk 38 is fusion bonded to the rotor base 32. In this instance, the rotor base 32 is preferably made of a glass filled plastic material to provide greater bonding strength. The side of the rotor disk 38 having the Teflon disk 42 provides the rotating surface 40 for the rotor 30.

With reference to FIG. 1, the rotary valve of the present invention further includes chambers walls 92 forming the valve chambers 18. The chamber walls 92 include a groove 94 for receiving a rubber gasket 96. A plastic wear strip 98 is also received by the groove 94 on top of the rubber gasket 96 to reduce the likelihood of the disk 42 from wedging the rubber gasket 96 out of the groove 94 and to reduce build up of contaminants on the disk 42. The plastic wear strip 98 may be made of a high density polyethylene, or it may be made of a flourocarbon such as Teflon.

The rotary valve further includes a safety shut-off piston 100 located in one of the chambers 18. The piston 100 is biased outwardly of the one chamber 18 by means of a spring 102. The piston 100 is designed to block one of the (circular) passages 46 in the event the valve breaks down, if the piston 100 and one passage 46 should align, in order to avoid an overflow. To reduce friction and contaminants, the piston 100 includes a recessed portion 104 which receives a Teflon piston disk 106.

The forgoing description and drawings were given for illustrative purposes only. It should be understood that the invention is not limited to the embodiments disclosed but is intended to embrace any and all alternatives, equivalents, modifications, and rearrangements of elements falling within the scope of the invention as defined by the claims.

We claim:

1. A method of manufacturing a valve rotor with a wear-resistant, low friction rotating surface, comprising:

providing a disk formed from a fluorocarbon polymer, the disk having a shape and an edge which correspond with the rotating surface of the valve rotor;

placing the disk at the bottom of a cavity of an injection mold;

injecting flowable plastic material into the mold such that the material fills a portion of the mold cavity, substantially surrounding and covering the edge of the disk;

solidifying the material to lock with the disk and to form a rotor disk;

removing the rotor disk from the mold; and securing the rotor disk to the base of the valve rotor with the disk facing outwardly and providing the rotating surface.

2. The method of manufacturing the valve rotor as defined in claim 1, wherein the fluorocarbon polymer is polytetrafluoroethylene.

3. The method of manufacturing the valve rotor as defined in claim 2, wherein the polymer disk is formed having an edge which is angled with respect to the axis of the disk.

4. The method of manufacturing the valve rotor as defined in claim 3, wherein the disk is placed in the mold cavity with the angled edge extending inwardly toward the bottom of the cavity.

5. The method of manufacturing the valve rotor as defined in claim 4, wherein the disk includes at least one passage having an angled passage edge, and the step of injecting flowable material includes substantially surrounding and covering the angled passage edge.

6. The method of manufacturing the valve rotor as defined in claim 4, wherein, prior to injecting the flowable material into the mold, the disk is retained against the bottom of the mold cavity by a retaining means to prevent the material from flowing between the disk and the bottom of the mold cavity.

7. The method of manufacturing the valve rotor as defined in claim 4, wherein the flowable material is injected from above the disk located at the bottom of the cavity.

* * * * *